United States Patent
Zhang et al.

(10) Patent No.: US 11,328,399 B2
(45) Date of Patent: May 10, 2022

(54) METHOD AND APPARATUS, AND STORAGE MEDIUM FOR PROCESSING STYLE IMAGE

(71) Applicant: BEIJING DAJIA INTERNET INFORMATION TECHNOLOGY CO., LTD., Beijing (CN)

(72) Inventors: Lei Zhang, Beijing (CN); Hongmin Xu, Beijing (CN)

(73) Assignee: Beijing Daja Internet Information Technology Co., Ltd., Beijing (CN)

( * ) Notice: Subject to any disclaimer, the term of this patent is extended or adjusted under 35 U.S.C. 154(b) by 99 days.

(21) Appl. No.: 16/863,319

(22) Filed: Apr. 30, 2020

(65) Prior Publication Data
US 2020/0364839 A1   Nov. 19, 2020

(30) Foreign Application Priority Data

May 17, 2019   (CN) .......................... 201910412049.0

(51) Int. Cl.
*G06T 5/00*   (2006.01)
*G06T 5/50*   (2006.01)
(Continued)

(52) U.S. Cl.
CPC .................. *G06T 5/50* (2013.01); *G06T 3/40* (2013.01); *G06T 5/005* (2013.01); *G06T 5/20* (2013.01);
(Continued)

(58) Field of Classification Search
CPC ......... G06T 11/001; G06T 2207/20081; G06T 2207/20221; G06T 2207/20084; G06K 9/00744
See application file for complete search history.

(56) References Cited

U.S. PATENT DOCUMENTS

| | | | |
|---|---|---|---|
| 2010/0124374 A1* | 5/2010 | Wang ........................ | G06T 7/90 382/167 |
| 2011/0064327 A1* | 3/2011 | Dagher ................... | G06T 5/004 382/263 |

(Continued)

FOREIGN PATENT DOCUMENTS

| | | |
|---|---|---|
| CN | 106331510 A | 1/2017 |
| CN | 109472270 A | 3/2019 |
| CN | 109523460 A | 3/2019 |

OTHER PUBLICATIONS

Deng, Nan, et al. "The contour image style-transfer-based convolutional neural network." International Workshop on Advanced Image Technology (IWAIT) 2019. vol. 11049. International Society for Optics and Photonics, 2019.*

(Continued)

*Primary Examiner* — Li Liu
(74) *Attorney, Agent, or Firm* — Meunier Carlin & Curfman LLC (57) ABSTRACT

Disclosed are a method and apparatus, and a storage medium for processing a style image. The method includes: acquiring an initial image and a corresponding style image with brightness and chroma being separately represented; determining a first to-be-processed area in the style image, and determining a second to-be-processed area corresponding to the first to-be-processed area in the initial image; replacing a brightness component of the first to-be-processed area with a brightness component of the second to-be-processed area for the style image; filtering a chroma component of the first to-be-processed area for the style image; and generating an output image according to a processed style image.

11 Claims, 4 Drawing Sheets

(51) Int. Cl.
*G06T 3/40* (2006.01)
*G06T 5/20* (2006.01)

(52) U.S. Cl.
CPC .............. *G06T 2207/10024* (2013.01); *G06T 2207/20081* (2013.01)

(56) References Cited

U.S. PATENT DOCUMENTS

| | | | | |
|---|---|---|---|---|
| 2016/0364625 | A1* | 12/2016 | Lin | G06T 7/90 |
| 2017/0139572 | A1* | 5/2017 | Sunkavalli | G06F 3/04842 |
| 2018/0322662 | A1* | 11/2018 | Hellier | G06T 11/001 |
| 2020/0374600 | A1* | 11/2020 | Xu | H04N 21/44008 |
| 2022/0006992 | A1* | 1/2022 | Ishimatsu | H04N 9/646 |

OTHER PUBLICATIONS

Gatys, Leon A., et al. "Controlling perceptual factors in neural style transfer." Proceedings of the IEEE Conference on Computer Vision and Pattern Recognition. 2017.*

Gatys, Leon A., et al. "Preserving color in neural artistic style transfer." arXiv preprint arXiv:1606.05897 (2016).*

Castillo, Carlos, et al. "Son of zorn's lemma: Targeted style transfer using instance-aware semantic segmentation." 2017 IEEE International Conference on Acoustics, Speech and Signal Processing (ICASSP). IEEE, 2017.*

Qiao, Lisha, "Artistic Style Transfer Based on Deep Learning" Thesis, May 2018, 66 pages. English Abstract included.

Zheng et al., "Synthesis of Embroidery Based on Convolutional Netural Network", Journal of Zhejiang Univ 46(3), May 14, 2019, 270-278. English Abstract included.

Li Haiyang, "Research on Facial Image Transferring Based on Features Extracted in Frequency Domain", Thesis submitted to Xidian Univ, Jun. 2017, 63 pages. English Abstract included.

Gatys, Leon A., et al. "Preserving color in neural artistic style transfer." arXiv preprint arXiv: 1606.05897 (2016), 8 pages.

Gatys, et al., "Controlling Perceptual Factors in Neural Style Transfer", Proceedings of the IEEE Conference on Computer Vision and Pattern Recognition, 2017, 3985-3993.

* cited by examiner

METHOD AND APPARATUS, AND STORAGE MEDIUM FOR PROCESSING STYLE IMAGE

CROSS REFERENCE TO RELATED APPLICATIONS

This application claims priority to Chinese Patent Application No. 201910412049.0, filed on May 17, 2019, which is hereby incorporated by reference in its entirety.

FIELD

The present disclosure relates to the field of image processing and in particular to an image processing method and apparatus, an electronic device and a storage medium.

BACKGROUND

Image style migration is an image generating method. The method is to convert other images into images with styles such as painting stylization and season stylization on the premise that a style image is given. By using the method, an image may be converted into an image with another representation style so as to achieve a brand new effect.

SUMMARY

The present disclosure provides an image processing method and apparatus, an electronic device and a storage medium so as to at least solve the problems of image processing disharmony and poor integration sense in related art. The present disclosure discloses following solutions.

According to a first aspect of an embodiment of the present disclosure, an image processing method is provided, including: acquiring an initial image and a corresponding style image with brightness and chroma being separately represented; determining a first to-be-processed area in the style image, and determining a second to-be-processed area corresponding to the first to-be-processed area in the initial image; replacing a brightness component of the first to-be-processed area with a brightness component of the second to-be-processed area for the style image; filtering a chroma component of the first to-be-processed area for the style image; and generating an output image according to the processed style image.

Optionally, the acquiring the initial image and the corresponding style image with the brightness and the chroma being separately represented includes: acquiring a preset initial image and a corresponding preset style image; converting the preset initial image and/or the preset style image to have brightness and chroma being separately represented when brightness and the chroma of the preset initial image and/or the preset style image are not separately represented; and respectively taking the preset initial image and the preset style image with the brightness and the chroma being separately represented as the initial image and the style image.

Optionally, the generating the output image according to the processed style image includes: converting the processed style image into an output image with a preset format when the processed style image is not in the preset format; and taking the processed style image as the output image when the processed style image is in the preset format.

Optionally, the replacing the brightness component of the first to-be-processed area with the brightness component of the second to-be-processed area for the style image includes: when the sizes of the initial image and the style image are same, replacing a brightness component of each pixel point in the first to-be-processed area in the style image with a brightness component of a pixel point at a same position in the second to-be-processed area; and when the sizes of the initial image and the style image are different, converting the initial image to have a size same as that of the style image, and replacing a brightness component of each pixel point in the first to-be-processed area in the style image with a brightness component of a pixel point at a same position in the second to-be-processed area of a converted initial image.

Optionally, the determining the first to-be-processed area in the style image, and determining the second to-be-processed area corresponding to the first to-be-processed area in the initial image includes: determining the first to-be-processed area in the style image by utilizing a deep web, where the deep web is obtained by performing training by taking a specified to-be-processed area in an image processing sample acquired in advance as a target; and according to a position of the first to-be-processed area in the style image, determining an area same as the position in the initial image to obtain the second to-be-processed area corresponding to the first to-be-processed area.

According to a second aspect of an embodiment of the present disclosure, an image processing apparatus is provided, including a memory, a processor and a computer program stored in the memory, where the processor is configured to execute the computer program to: acquire an initial image and a corresponding style image with brightness and chroma being separately represented; determine a first to-be-processed area in the style image and determine a second to-be-processed area corresponding to the first to-be-processed area in the initial image; replace a brightness component of the first to-be-processed area with a brightness component of the second to-be-processed area for the style image; filter a chroma component of the first to-be-processed area for the style image; and generate an output image according to the processed style image.

Optionally, the processor is further configured to execute the computer program to: acquire a preset initial image and a corresponding preset style image; convert the preset initial image and/or the preset style image to have brightness and chroma being separately represented when the brightness and the chroma of the preset initial image and/or the preset style image are not separately represented; and respectively take the preset initial image and the preset style image with the brightness and the chroma being separately represented as the initial image and the style image.

Optionally, the processor is further configured to execute the computer program to: convert the processed style image into an output image with a preset format when the processed style image is not in the preset format; and take the processed style image as the output image when the processed style image is in the preset format.

Optionally, the processor is further configured to execute the computer program to: replace a brightness component of each pixel point in the first to-be-processed area in the style image with a brightness component of a pixel point at a same position in the second to-be-processed area when sizes of the initial image and the style image are same; and convert the initial image to have a size same as that of the style image and replace a brightness component of each pixel point in the first to-be-processed area in the style image with a brightness component of a pixel point at a same position in the second to-be-processed area of the converted initial image when sizes of the initial image and the style image are different.

Optionally, the processor is further configured to execute the computer program to: determine the first to-be-processed area in the style image by utilizing a deep web, where the deep web is obtained by performing training by taking a specified to-be-processed area in an image processing sample acquired in advance as a target; and determine an area same as a position in the initial image according to the position of the first to-be-processed area in the style image to obtain the second to-be-processed area corresponding to the first to-be-processed area.

According to a third aspect of an embodiment of the present disclosure, a non-transitory computer readable storage medium is provided for storing a computer program, any one of the image processing methods in the above-mentioned first aspect is implemented when the computer program is executed by a processor.

BRIEF DESCRIPTION OF THE DRAWINGS

Accompanying drawings herein are incorporated into the description, construct one part of the description, show embodiments conforming to the present disclosure and are configured to explain the principle of the present disclosure together with the description, rather than to construct inappropriate limitations to the present disclosure.

DETAILED DESCRIPTION OF THE EMBODIMENTS

In order to make ordinary those skilled in the art better understand solutions of the present disclosure, the solutions in the embodiments of the present disclosure will be described clearly and completely below in combination with accompanying drawings.

It should be noted that terms such as "first" and "second" in the specification, the claims and the above-mentioned accompanying drawings of the present disclosure are configured to distinguish similar objects, but are not necessary to be configured to describe a specific order or precedence order. It should be understood that data used in such a way can be interchanged under an appropriate condition, so that the embodiments of the present disclosure described herein can be implemented in an order except those illustrated or described herein. Implementation ways described in the following exemplary embodiments do not represent for all implementation ways consistent with the present disclosure, and oppositely, are only examples of apparatuses and methods described in the appended claims in detail and consistent with some aspects of the present disclosure.

Existing image style migration methods are mostly used for full image processing, parts of textures in an image are not expected to appear in some specific scenes, for example, textures shown by image stylization of a face part are generally not expected to be especially obvious in a human figure photograph scene, or else, a weird effect may be generated. With specific to such a scene, a foreground part is generally directly partitioned from an original image and is replaced with a foreground part corresponding a data image or is processed through color conversion, namely the foreground part in the original image and a foreground part subjected to stylized output are converted into an LAB space and are then subjected to spatial migration by calculating respective average means and variances, thereby realizing foreground style conversion.

However, the direct replacement of the foreground part may result in disharmony and poor integration sense of a part subjected to image style migration and may make people feel an obvious difference existing between the foreground part and remaining parts in the original image, while an image subjected to style migration through color conversion has the situations of disharmony and poor integration sense under a certain condition due to a difference of models.

Figure 1:
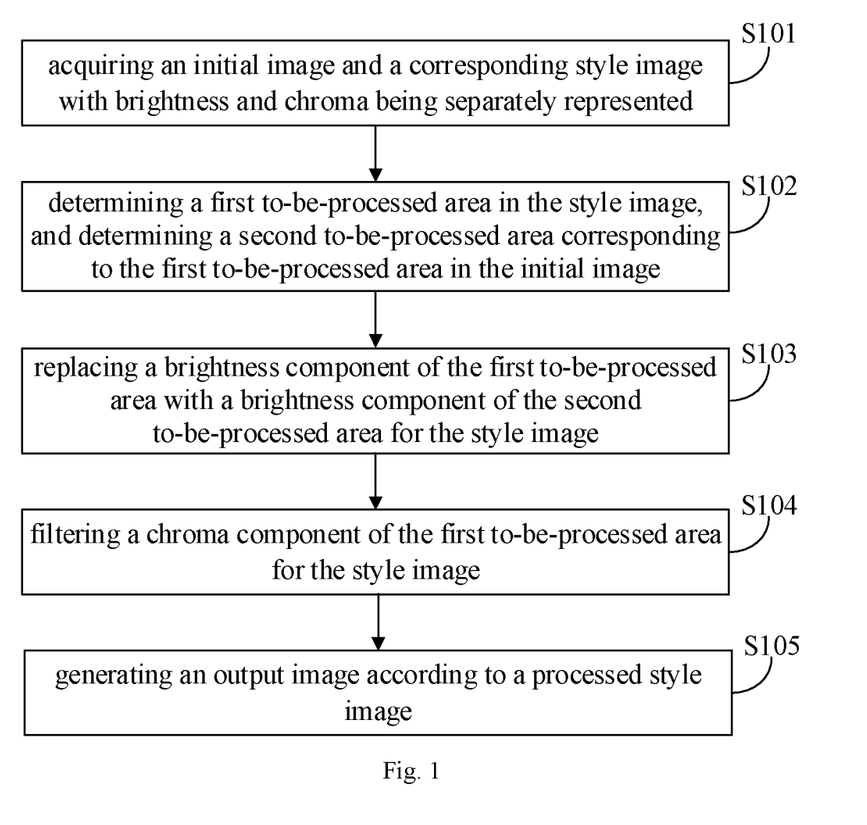
FIG. 1 is a flow diagram of an image processing method shown according to an exemplary embodiment.

FIG. 1 is a flow diagram of an image processing method provided by an embodiment of the present disclosure, as shown in FIG. 1, the method may include following S101 to S105.

S101, an initial image and a corresponding style image with brightness and chroma being separately represented are acquired.

In the embodiment of the present disclosure, the style image refers to an image subjected to image style migration with reference to a style of the initial image. The initial image refers to a reference image for image style migration, it can be understood that the style image is obtained by processing an image according to the style of the initial image.

A traditional image style migration way is to perform overall style migration on an original image, resulting in over-deep textures in some areas of a style image obtained by conversion, and disharmony relative to the content of the image, such as a face part of a human image, a window in a street scene photograph and sunrise in a landscape photograph. In this way, the style image subjected to overall style migration is required to be processed.

The initial image and the corresponding style image with brightness and chroma being separately represented may be a YUV (a color coding method, where Y represents for brightness, UV represents for chroma, and U and V are respectively two components forming a color) space, an LAB (L represents for brightness, A represents for chroma within a range from red to green, and B represents for chroma within a range from yellow to blue) space and an HSV (H represents for hue, S represents for saturation, and V represents for brightness) space, the brightness of the color spaces is separately processed, and the remaining part may be used as the chroma. For example, in the YUV space, Y may be used as a brightness variable, and a combination of UV may be used as a chroma component.

S102, a first to-be-processed area is determined in the style image, and a second to-be-processed area corresponding to the first to-be-processed area is determined in the initial image.

In the embodiments of the present disclosure, the style image is over deep in local texture to result in disharmony of an overall effect, therefore, the first to-be-processed area in the style image is required to be determined, where the first to-be-processed area refers to a part required to be processed in the style image, and thus, a phenomenon of style image disharmony is eliminated. Moreover, the second to-be-processed area at a corresponding position is extracted from the initial image, where the corresponding position refers to a coordinate, dimension and size of the first to-be-processed area in the style image, corresponding to a coordinate, dimension and size of the second to-be-processed area in the initial image. The remaining area except the first to-be-processed area in the style image may be not required to be processed. In practical application, a way of determining the first to-be-processed area by neural network model training has the advantages of high efficiency and wide application range; or a way of selecting a to-be-processed area on the style image by a user may be adopted, and the way has the advantage of high accuracy rate. However, for parts of types of images such as a landscape image, the user cannot determine positions where textures are over deep to result in disharmony of the overall effect of the style image, but for a style image of a human image, for example, it is easy for the user to determine that the texture of the face part is over deep to result in the disharmony phenomenon.

S103, a brightness component of the first to-be-processed area is replaced with a brightness component of the second to-be-processed area for the style image.

In the embodiments of the present disclosure, the color spaces of the style image and the initial image may be selected as the YUV space, the brightness is a Y component, the chroma is a U component and a V component, a Y component of the second to-be-processed area is extracted, and a Y component of the first to-be-processed area is replaced with the Y component of the second to-be-processed area.

S104, a chroma component of the first to-be-processed area is filtered for the style image.

S105, an output image is generated according to a processed style image.

In the embodiments of the present disclosure, after the brightness component and the chroma component of the style image are processed, the restoration operation for the style image is affirmed to be completed, the processed style image with the brightness and chroma being separately represented may be converted into an output image with a preset format, may be converted into an output image with an RGB format recognized by eyes of a person and also may also be converted into an output image with other formats, such as an image signal for communication transmission, according to demands of practical application.

In the embodiment of the present disclosure, the texture of the first to-be-processed area of the style image is over deep to result in disharmony of the overall effect of the style image, the chroma components of the first to-be-processed area, namely the U component and the V component of the first to-be-processed, are subjected to filtering to achieve a denoising effect, the filtering may be geometric mean filtering, smoothness reached by the filtering way may be compared with that of an arithmetic mean filter, but less image details may be lost in a filtering process. A neighborhood averaging method is suitable for removing granularity noise in an image obtained by scanning. The filtering way herein is merely exemplary, and a specific filtering way may be determined according to an actual demand, which is not limited herein. After the chroma component and the brightness component of the first to-be-processed area are processed, optimization processing for the style image is completed to obtain the style image with the brightness and chroma being separately represented.

The technical solutions provided by the embodiments of the present disclosure at least bring the following beneficial effects.

In the embodiments of the present disclosure, the initial image and the corresponding style image with brightness and chroma being separately represented are acquired; the first to-be-processed area is determined in the style image, and the second to-be-processed area corresponding to the first to-be-processed area is determined in the initial image; the brightness component of the first to-be-processed area is replaced with the brightness component of the second to-be-processed area for the style image; the chroma component of the first to-be-processed area is filtered for the style image; and the output image is generated according to the processed style image. In an image style migration process, the first to-be-processed area and the second to-be-processed area are used as a foreground part, the integration sense of a stylized image is improved due to the replacement of the brightness component, the texture of the foreground part is weakened due to filtering, and the overall harmony of the stylized image is improved.

Figure 2:
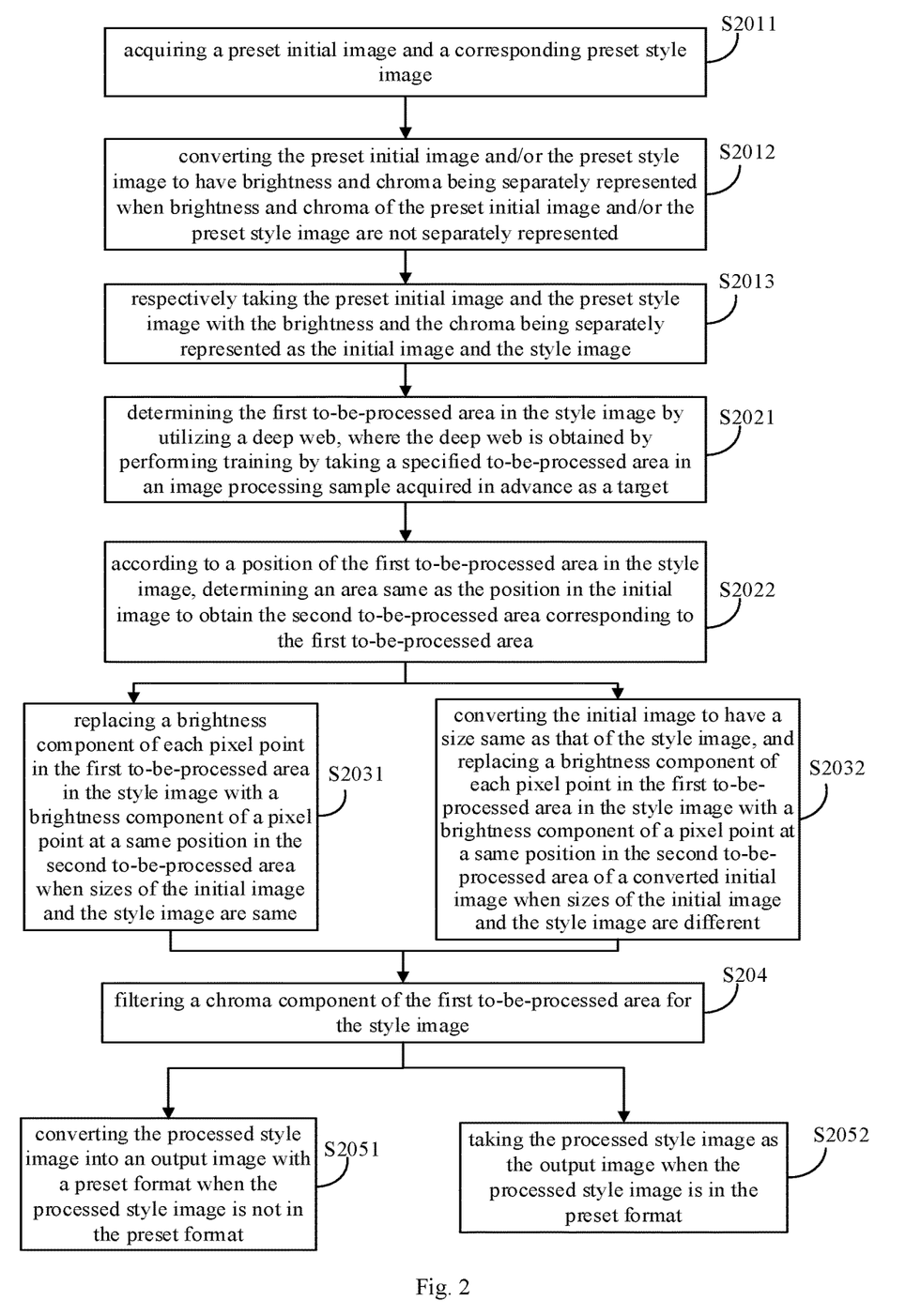
FIG. 2 is a flow diagram of another image processing method shown according to an exemplary embodiment.

FIG. 2 is a step flow diagram of another image processing method provided by an embodiment of the present disclosure, as shown in FIG. 2, the method may include following steps.

S201, an initial image and a corresponding style image with brightness and chroma being separately represented are acquired.

The step may refer to the detailed description of S101, which is not repeatedly described herein.

Optionally, S201 may include following steps.

S2011, a preset initial image and a corresponding preset style image are acquired.

S2012, the preset initial image and/or the preset style image are converted to have brightness and chroma being separately represented when the brightness and the chroma of the preset initial image and/or the preset style image are not separately represented.

In the embodiments of the present disclosure, the preset initial image and the preset style image may be in an RGB format, the RGB format is a color standard in the industry and is to obtain various colors through the variation and mutual superposition of three color channels of R (Red), G (Green) and B (Blue), an RGB component of each pixel in an image is allocated with a strength value within an range of 0-255 and generates 16777216 colors on a screen, and the format almost includes colors which may be perceived by the eyesight of human beings. Generally, obtained images may be a style image and an initial image with the RGB format which may be recognized by eyes of a person, a preset style image and a preset initial image adopting other color spaces may also be acquired, but in a process of processing the style image, the preset style image and the preset initial image are required to be converted to be in a color space format with brightness and chroma being separately represented. It can be understood by those skilled in the art that the formats of the preset initial image and the preset style image may be an image representation format determined according to an actual condition, which is not limited in the present disclosure.

S2013, the preset initial image and the preset style image with the brightness and the chroma being separately represented are respectively taken as the initial image and the style image.

In the embodiments of the present disclosure, the brightness and the chroma of the preset initial image and the preset style image may be separately represented, for example, a video format NV21 and NV12 (two image formats commonly used for Android, where the chroma and the brightness are represented on two planes) or YUV browsed on a mobile phone is a format with brightness and chroma being separately represented, in this case, the preset initial image and the preset style image may be directly used as an initial image and a style image so as to perform subsequent image processing.

In the embodiments of the present disclosure, the preset initial image and the preset style image with the RGB format are converted to be in the color space format with brightness and chroma being separately represented to be suitable for image data with various different color space formats, so that the conversion practicability of the style image is improved.

S202, a first to-be-processed area is determined in the style image, and a second to-be-processed area corresponding to the first to-be-processed area is determined in the initial image.

The step may refer to the detailed description of S102, which is not repeatedly described herein.

Optionally, S202 may include following steps.

S2021, a first to-be-processed area is determined in the style image by utilizing a deep web, where the deep web is obtained by performing training by taking a specified to-be-processed area in an image processing sample acquired in advance as a target.

In the embodiments of the present disclosure, the deep web is obtained by training sample data acquired in advance and used for processing an image, and the deep web capable of partitioning the style image may be obtained by training data for a user to select to-be-processed areas for different types of images. The deep web may also be to train a special type of image sample data such as human image data, and it can be understood that the over deep texture of a face part of a human image can result in disharmony of the overall effect of the image. Compared with a deep web for training various types of pictures, the special deep web for one type of image lies in that the determination accuracy of to-be-processed areas in the image is higher.

S2022, according to a position of the first to-be-processed area in the style image, an area same as the position is determined in the initial image to obtain the second to-be-processed area corresponding to the first to-be-processed area.

The step may refer to the detailed description of S102, which is not repeatedly described herein.

In the embodiments of the present disclosure, a to-be-processed area is extracted from style data by utilizing the deep web obtained by training the image processing sample acquired in advance, so that an aim of controlling the to-be-processed area of the style image is achieved, and the processing efficiency and accuracy of the style image are improved.

S203, a brightness component of the first to-be-processed area is replaced with a brightness component of the second to-be-processed area for the style image.

The step may refer to the detailed description of S103, which is not repeatedly described herein.

Optionally, S203 may include following steps.

S2031, a brightness component of each pixel point in the first to-be-processed area in the style image is replaced with a brightness component of a pixel point at a same position in the second to-be-processed area when the sizes of the initial image and the style image are same.

In the embodiments of the present disclosure, the style image is obtained by performing overall style migration on an original image according to the initial image, therefore, the sizes of the initial image and the style image are processed uniformly during conversion, and furthermore, the sizes of the initial image and the style image are consistent.

The sizes and resolution ratios of the first to-be-processed area and the second to-be-processed area are kept consistent, therefore, pixel points in the first to-be-processed area respectively correspond to pixel points in the second to-be-processed area, and the replacement of the brightness component of the first to-be-processed area is realized by replacing the brightness component of each pixel point in the first to-be-processed area with a corresponding pixel point in the second to-be-processed area.

S2032, the initial image is converted to have a size same as that of the style image, and a brightness component of each pixel point in the first to-be-processed area in the style image is replaced with a brightness component of a pixel point at a same position in the second to-be-processed area of the converted initial image when the sizes of the initial image and the style image are different.

In the embodiments of the present disclosure, if the sizes of the initial image and the style image are different, the pixel points may not correspond to each other, and the chroma component and the brightness component of the style image may not be replaced, so that in order to ensure the effect of the style image, the extension or compression of the style image is required to be avoided as much as possible, and the chroma component and the brightness component of the style image may be replaced after the size of the initial image is converted to be the same as that of the style image.

In the embodiments of the present disclosure, the sizes of the initial image and the style image and positions of the to-be-processed areas are unified, so that it is ensured that corresponding processing of each pixel point in a conversion process of a stylized image, as well as the efficiency and the accuracy of processing the stylized image are guaranteed.

S204, a chroma component of the first to-be-processed area is filtered for the style image.

The step may refer to the detailed description of S104, which is not repeatedly described herein.

S205, the filtered style image is converted into an output image with a preset format.

Optionally, S205 may include following steps.

S2051, the processed style image is converted into an output image with a preset format when the processed style image is not in the preset format.

S2052, the processed style image is taken as the output image when the processed style image is in the preset format.

In the embodiments of the present disclosure, if the preset format is also a format with the chroma and brightness being separately represented, however, in consideration of the existence of various formats with chroma and brightness being separately represented, the processed style image is also required to be subjected to format conversion. Of course, if the preset format is same as the format of the processed style image, the processed style image may be directly used as the output image, so that a step of image stylization migration is simplified, and the overall image stylization migration efficiency is improved.

The technical solutions provided by the embodiments of the present disclosure at least bring the following beneficial effects.

In the embodiments of the present disclosure, the initial image and the corresponding style image with the brightness and chroma being separately represented are acquired; the first to-be-processed area is determined in the style image, and the second to-be-processed area corresponding to the first to-be-processed area is determined in the initial image; the brightness component of the first to-be-processed area is replaced with the brightness component of the second to-be-processed area for the style image; the chroma component of the first to-be-processed area is filtered for the style image; and the output image is generated according to the processed style image. In the image style migration process, the first to-be-processed area and the second to-be-processed area are used as the foreground part, the integration sense of the stylized image is improved due to the replacement of the brightness component, the texture of the foreground part is weakened due to filtering, and the overall harmony of the stylized image is improved.

Figure 3:
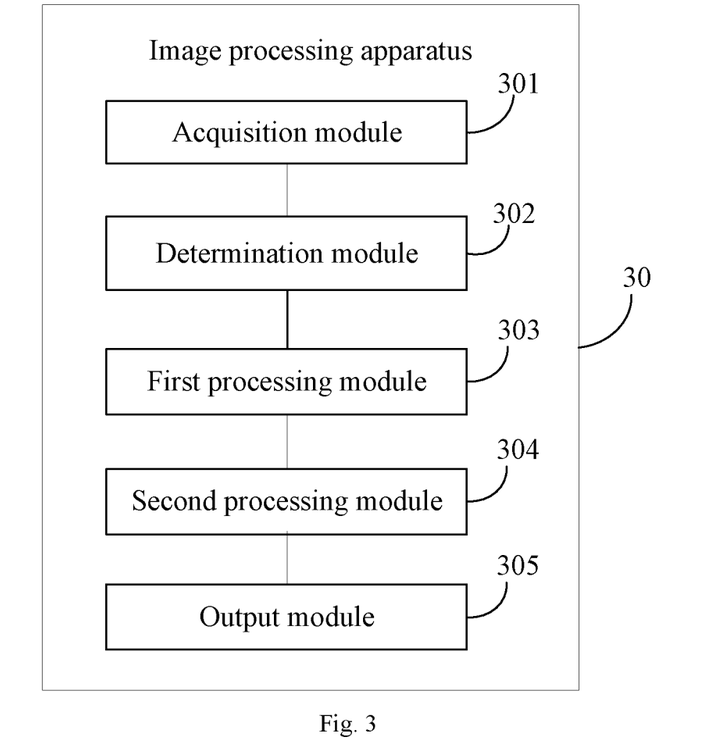
FIG. 3 is block diagram of an image processing apparatus shown according to an exemplary embodiment.

FIG. 3 is a structural block diagram of an image processing apparatus 30 shown according to an exemplary embodiment, referring to FIG. 3, the apparatus 30 includes: an acquisition module 301, a determination module 302, a first processing module 303, a second processing module 304 and an output module 305.

The acquisition module 301 is configured to acquire an initial image and a corresponding style image with brightness and chroma being separately represented.

The determination module 302 is configured to determine a first to-be-processed area in the style image and determine a second to-be-processed area corresponding to the first to-be-processed area in the initial image.

The first processing module 303 is configured to replace a brightness component of the first to-be-processed area with a brightness component of the second to-be-processed area for the style image.

The second processing module 304 is configured to filter a chroma component of the first to-be-processed area for the style image.

The output module 305 is configured to generate an output image according to the processed style image.

In the embodiments of the present disclosure, the acquisition module is configured to acquire the initial image and the corresponding style image with the brightness and chroma being separately represented; the determination module is configured to determine the first to-be-processed area in the style image and determine the second to-be-processed area corresponding to the first to-be-processed area in the initial image; the first processing module is configured to replace the brightness component of the first to-be-processed area with the brightness component of the second to-be-processed area for the style image; the second processing module is configured to filter the chroma component of the first to-be-processed area for the style image; and the output module is configured to generate the output image according to the processed style image. In an image style migration process, the first to-be-processed area and the second to-be-processed area are used as a foreground part, the integration sense of a stylized image is improved due to the replacement of the brightness component, the texture of the foreground part is weakened due to filtering, and the overall harmony of the stylized image is improved.

Figure 4:
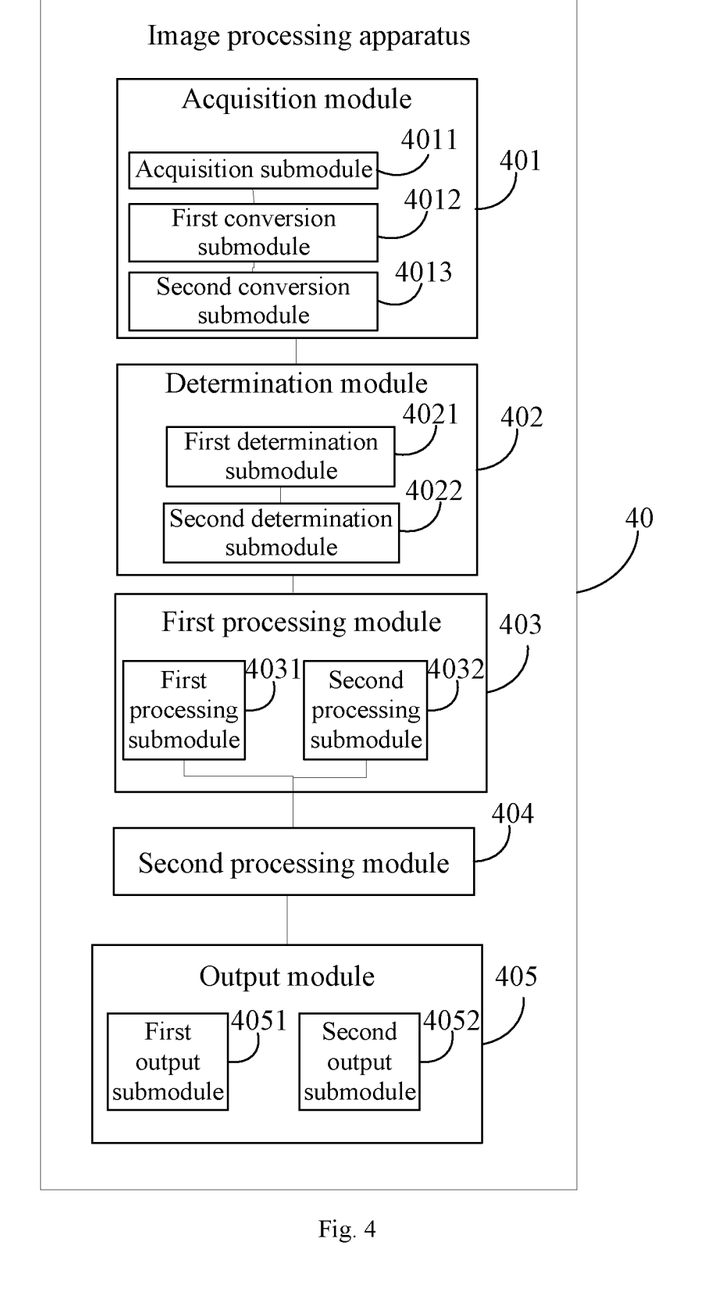
FIG. 4 is a block diagram of another image processing apparatus shown according to an exemplary embodiment.

FIG. 4 is a structural block diagram of another image processing apparatus 40 shown according to an exemplary embodiment, referring to FIG. 4, the apparatus 40 includes an acquisition module 401, a determination module 402, a first processing module 403, a second processing module 404 and an output module 405.

The acquisition module 401 is configured to acquire an initial image and a corresponding style image with brightness and chroma being separately represented.

Optionally, the acquisition module 401 includes an acquisition submodule 4011, a first conversion submodule 4012 and a second conversion submodule 4013.

The acquisition submodule 4011 is configured to acquire a preset initial image and a corresponding preset style image.

The first conversion submodule 4012 is configured to convert the preset initial image and/or the preset style image to have brightness and chroma being separately represented when the brightness and chroma of the preset initial image and/or the preset style image are not separately represented.

The second conversion submodule 4013 is configured to respectively take the preset initial image and the preset style image with the brightness and the chroma being separately represented as an initial image and a style image.

The determination module 402 is configured to determine a first to-be-processed area in the style image and determine a second to-be-processed area corresponding to the first to-be-processed area in the initial image.

Optionally, the determination module 402 includes: a first confirmation submodule 4021 configured to determine a first to-be-processed area in the style image by utilizing a deep web, where the deep web is obtained by performing training by taking a specified to-be-processed area in an image processing sample acquired in advance as a target; and a second confirmation submodule 4022 configured to determine an area same as a position in the initial image according to the position of the first to-be-processed area in the style image to obtain a second to-be-processed area corresponding to the first to-be-processed area.

The first processing module 403 is configured to replace a brightness component of the first to-be-processed area with a brightness component of the second to-be-processed area for the style image.

The first processing module 403 includes: a first processing submodule 4031 configured to replace a brightness component of each pixel point in the first to-be-processed area in the style image with a brightness component of a pixel point at a same position in the second to-be-processed area when the sizes of the initial image and the style image are same; and a second processing submodule 4032 configured to convert the initial image to have a size same as that of the style image and replace a brightness component of each pixel point in the first to-be-processed area in the style image with a brightness component of a pixel point at a same position in the second to-be-processed area of the converted initial image when the sizes of the initial image and the style image are different.

The second processing module 404 is configured to filter a chroma component of the first to-be-processed area for the style image.

The output module 405 is configured to generate an output image according to the processed style image.

Optionally, the output module 405 includes: a first output submodule 4051 configured to convert the processed style image into an output image with a preset format when the processed style image is not in the preset format; and a second output submodule 4052 configured to take the processed style image as the output image when the processed style image is in the preset format.

In the embodiment of the present disclosure, the acquisition module is configured to acquire the initial image and the corresponding style image with the brightness and chroma being separately represented; the determination module is configured to determine the first to-be-processed area in the style image and determine the second to-be-processed area corresponding to the first to-be-processed area in the initial image; the first processing module is configured to replace the brightness component of the first to-be-processed area with the brightness component of the second to-be-processed area for the style image; the second processing module is configured to filter the chroma component of the first to-be-processed area for the style image; and the output module is configured to generate the output image according to the processed style image. In an image style migration process, the first to-be-processed area and the second to-be-processed area are used as a foreground part, the integration sense of a stylized image is improved due to the replacement of the brightness component, the texture of the foreground part is weakened due to filtering, and the overall harmony of the stylized image is improved.

With respect to the apparatus in the above-mentioned embodiments, specific operation ways of the modules are described in detail in the embodiments of the relevant method, which are not illustrated in detail herein.

In addition, an embodiment of the present disclosure further provides an electronic device including a processor, a memory and a computer program stored in the memory and capable of operating on the processor, processes of the embodiment of the above-mentioned the image processing method are implemented when the computer program is executed by the processor, and same technical effects may be achieved. The processes are not repeatedly described herein in order to avoid repetition.

An embodiment of the present disclosure further provides a non-transitory computer readable storage medium storing a computer program, processes of the embodiment of the above-mentioned image processing method are implemented when the computer program is executed by a processor, and same technical effects may be achieved. The processes are not repeatedly described herein in order to avoid repetition. The computer readable storage medium may be an ROM (Read-Only Memory), an RAM (Random Access Memory), a diskette or an optical disc and the like.

The embodiments in the specification are described by adopting a progressive way, differences from other embodiments are highlighted in each of the embodiments, and the same and similar portions among the embodiments refer to each other.

It is easy for those skilled in the art to think that applications of any combinations of the above-mentioned embodiments are feasible, and therefore, any combinations of the above-mentioned embodiments are implementation solutions of the present disclosure, however, the specification will not describe the combinations in detail herein due to the space limitation.

The image processing method provided herein is not inherently relevant to any specific computers, virtual systems or other devices. Various general-purpose systems can also be used together with demonstration based on the specification. According to above description, it is apparent to construct a structure required by a system with the solution of the present disclosure. In addition, the present disclosure does not direct at any specific programming languages. It should be understood that the content of the present disclosure described herein can be achieved by virtue of various programming languages, and the above description for specific languages is intended to disclose an optimal implementation way of the present disclosure.

A large number of concrete details are described in the specification provided herein. However, it can be understood that the embodiments of the present disclosure can be practiced without the concrete details. In some examples, known methods, structures and technologies are not shown in detail so as not to indistinctly understand the specification.

Similarly, it should be understood that, in the above descriptions of the exemplary embodiments of the present disclosure, features of the present disclosure are sometimes grouped into a single embodiment and figure or a description thereof in order to simplify the present disclosure and help understand one or more of the disclosed aspects. However, the method provided by the present disclosure should not be explained to reflect the following intention: the present disclosure claimed for protection requests more features than those clearly recorded in each of claims. More exactly, as reflected in the claims, the disclosed aspects lie in all the features less than those of the single embodiment disclosed above. Therefore, the claims conforming to the specific embodiments are clearly incorporated into the specific embodiments, where each of the claims serves as a separate embodiment of the present disclosure.

It can be understood by those skilled in the art that the modules in the apparatus in the embodiment can be adaptively changed and arranged in one or more apparatuses different from the apparatus in the embodiment. The modules or units or components in the embodiment can be combined into one module or unit or component and can also be divided into a plurality of submodules or subunits or subcomponents. The features disclosed in the specification (including the accompanying claims, abstract and accompanying drawings) and processes and units of any methods or devices disclosed herein can be combined by adopting any combinations except that at least some of such features and/or processes or units are repulsive to each other. Unless otherwise clearly stated, each of the features disclosed in the specification (including the accompanying claims, abstract and accompanying drawings) can be replaced with substituent features providing same, equivalent or similar purposes.

In addition, it can be understood by those skilled in the art that some embodiments herein include some features included in other embodiments, rather than other features, but the combination of the features in the different embodiments means to be within the scope of the present disclosure and form the different embodiments. For example, in claims, any one of the embodiments required for protection can be used in any combination way.

The embodiment of each component in the present disclosure can be implemented by virtue of hardware or a software module operating on one or more processors or a combination of the hardware and the software. It should be understood by those skilled in the art that some or all functions of some or all components in the image processing method according to the embodiment of the present disclosure can be realized by using a microprocessor or a digital signal processor (DSP) in practice. The present disclosure can also be implemented by a part of or all devices or apparatus programs (such as a computer program and a computer program product) configured to execute the method described herein. Such programs for implementing the present disclosure can be stored on a computer readable storage medium or can be in a form that one or more signals are provided. Such signals can be downloaded from an internet site or be provided by carrier signals or be provided in any other forms.

It should be noted that the above-mentioned embodiments are merely intended to describe the present disclosure, rather than to limit the present disclosure, and alternative embodiments can be designed by those skilled in the art without departing from the scope of the appended claims. In the claims, any reference symbols located between brackets should not be constructed as limitations to the claims. The word "comprise" does not exclude the existence of an element or step unlisted in the claims. The word "a" or "an" located before the element does not exclude the existence of a plurality of the elements. The present disclosure can be implemented by virtue of hardware including a number of different elements and a properly programmed computer. In unit claims in which a number of apparatuses are listed, a number of apparatuses in the apparatuses may be specifically implemented by virtue of the same hardware. Words such as first, second and third do not represent for any order. The words can be explained as names.

The invention claimed is:

1. An image processing method, comprising:
acquiring an initial image with brightness and chroma being separately represented and a corresponding style image with brightness and chroma being separately represented, wherein the initial image refers to a reference image for image style migration and the style image refers to an image subjected to the image style migration with reference to a style of the initial image;
determining a first to-be-processed area in the style image, and determining a second to-be-processed area, corresponding to the first to-be-processed area, in the initial image;
processing the style image by replacing a brightness component of the first to-be-processed area with a brightness component of the second to-be-processed area and filtering a chroma component of the first to-be-processed area; and
generating an output image according to the processed style image.

2. The image processing method of claim 1, wherein the acquiring the initial image with the brightness and the chroma being separately represented and the corresponding style image with the brightness and the chroma being separately represented comprises:
acquiring a preset initial image and a corresponding preset style image;
converting the preset initial image and/or the preset style image to have brightness and chroma being separately represented when brightness and chroma of the preset initial image and/or the preset style image are not separately represented; and
respectively taking the preset initial image and the preset style image with the brightness and the chroma being separately represented as the initial image and the style image.

3. The image processing method of claim 2, wherein the generating the output image according to the processed style image comprises:
converting the processed style image into an output image with a preset format when the processed style image is not in the preset format; and
taking the processed style image as the output image when the processed style image is in the preset format.

4. The image processing method of claim 1, wherein the replacing the brightness component of the first to-be-processed area with the brightness component of the second to-be-processed area comprises:
replacing a brightness component of each pixel point in the first to-be-processed area in the style image with a brightness component of a pixel point at a same position in the second to-be-processed area when sizes of the initial image and the style image are same; and
converting the initial image to have a size same as that of the style image, and replacing a brightness component of each pixel point in the first to-be-processed area in the style image with a brightness component of a pixel point at a same position in the second to-be-processed area of a converted initial image when sizes of the initial image and the style image are different.

5. The image processing method of claim 4, wherein the determining the first to-be-processed area in the style image, and determining the second to-be-processed area, corresponding to the first to-be-processed area, in the initial image comprises:
determining the first to-be-processed area in the style image by utilizing a deep web, wherein the deep web is obtained by performing training by taking a specified to-be-processed area in an image processing sample acquired in advance as a target; and
according to a position of the first to-be-processed area in the style image, determining an area same as the position in the initial image to obtain the second to-be-processed area corresponding to the first to-be-processed area.

6. An image processing apparatus, comprising a memory, a processor and a computer program stored in the memory, wherein the processor is configured to execute the computer program to:
acquire an initial image with brightness and chroma being separately represented and a corresponding style image with brightness and chroma being separately represented, wherein the initial image refers to a reference image for image style migration and the style image refers to an image subjected to the image style migration with reference to a style of the initial image;
determine a first to-be-processed area in the style image and determine a second to-be-processed area, corresponding to the first to-be-processed area, in the initial image;
process the style image by replacing a brightness component of the first to-be-processed area with a brightness component of the second to-be-processed area and filtering a chroma component of the first to-be-processed area; and
generate an output image according to the processed style image.

7. The apparatus of claim 6, wherein the processor is further configured to execute the computer program to:
acquire a preset initial image and a corresponding preset style image;
convert the preset initial image and/or the preset style image to have brightness and chroma being separately represented when brightness and chroma of the preset initial image and/or the preset style image are not separately represented; and
respectively take the preset initial image and the preset style image with the brightness and the chroma being separately represented as the initial image and the style image.

8. The apparatus of claim 7, wherein the processor is further configured to execute the computer program to:
convert the processed style image into an output image with a preset format when the processed style image is not in the preset format; and
take the processed style image as the output image when the processed style image is in the preset format.

9. The apparatus of claim 6, wherein the processor is further configured to execute the computer program to:
replace a brightness component of each pixel point in the first to-be-processed area in the style image with a brightness component of a pixel point at a same position in the second to-be-processed area when sizes of the initial image and the style image are same; and
convert the initial image to have a size same as that of the style image and replace a brightness component of each pixel point in the first to-be-processed area in the style image with a brightness component of a pixel point at a same position in the second to-be-processed area of a converted initial image when sizes of the initial image and the style image are different.

10. The apparatus of claim 9, wherein the processor is further configured to execute the computer program to:
  determine the first to-be-processed area in the style image by utilizing a deep web, wherein the deep web is obtained by performing training by taking a specified to-be-processed area in an image processing sample acquired in advance as a target; and
  determine an area same as a position in the initial image according to the position of the first to-be-processed area in the style image to obtain the second to-be-processed area corresponding to the first to-be-processed area.

11. A non-transitory computer readable storage medium storing a computer program, wherein the computer program is executed by a processor to perform:
  acquiring an initial image with brightness and chroma being separately represented and a corresponding style image with brightness and chroma being separately represented; wherein the initial image refers to a reference image for image style migration and the style image refers to an image subjected to the image style migration with reference to a style of the initial image;
  determining a first to-be-processed area in the style image, and determining a second to-be-processed area, corresponding to the first to-be-processed area, in the initial image;
  processing the style image by replacing a brightness component of the first to-be-processed area with a brightness component of the second to-be-processed area and filtering a chroma component of the first to-be-processed area; and
  generating an output image according to the processed style image.

* * * * *